(12) United States Patent
Winner et al.

(10) Patent No.: US 6,681,170 B2
(45) Date of Patent: Jan. 20, 2004

(54) TRACKING AND DRIVING SPEED REGULATING DEVICE FOR MOTOR VEHICLES

(75) Inventors: Hermann Winner, Bietigheim (DE); Winfried Koenig, Pfinztal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/105,703

(22) Filed: Mar. 25, 2002

(65) Prior Publication Data

US 2002/0177935 A1 Nov. 28, 2002

(30) Foreign Application Priority Data

Mar. 24, 2001 (DE) .......................... 101 14 470

(51) Int. Cl.[7] ................................. H04N 7/18
(52) U.S. Cl. .................. 701/93; 701/41; 701/91; 340/465; 180/204
(58) Field of Search ............... 701/93, 96, 301, 701/72, 41; 342/29, 104, 109; 340/902, 903, 435, 436, 444, 441, 465, 467, 459, 995, 460, 901, 905, 525; 180/170, 282, 169, 443, 446, 204; 345/173, 156, 157, 163

(56) References Cited

U.S. PATENT DOCUMENTS

| | | | |
|---|---|---|---|
| 5,245,422 A | * | 9/1993 | Borcherts et al. ........... 358/103 |
| 5,871,062 A | * | 2/1999 | Desens et al. .............. 180/169 |
| 6,219,604 B1 | * | 4/2001 | Dilger et al. ................. 701/41 |
| 6,353,788 B1 | * | 3/2002 | Baker et al. ................. 701/96 |
| 6,370,471 B1 | * | 4/2002 | Lohner et al. ............... 701/96 |
| 6,373,400 B1 | * | 4/2002 | Fujita et al. ............... 340/901 |
| 6,373,472 B1 | * | 4/2002 | Palalau et al. ............. 345/173 |
| 2001/0025211 A1 | * | 9/2001 | Shirai et al. .................. 701/1 |
| 2002/0138193 A1 | * | 9/2002 | Miyahara ..................... 701/96 |

FOREIGN PATENT DOCUMENTS

| JP | 61 009709 | 1/1986 |
|---|---|---|
| JP | 20 00168395 | 6/2000 |

* cited by examiner

Primary Examiner—Thomas G Black
Assistant Examiner—Tuan C To
(74) Attorney, Agent, or Firm—Kenyon & Kenyon

(57) ABSTRACT

A tracking and driving speed regulating device for motor vehicles, having a sensor device for detecting lane tracking, a steering regulator for evaluating signals from sensor device and for issuing steering commands to a steering actuator, and a speed regulator, acting upon the driving system of the vehicle, which may be switched to an operating state by a main switch and may be activated in the operating state by an actuation signal generated by an operating element, wherein the steering regulator may be switched to the operating state by a separate main switch independent of the speed regulator, and may be activated in the operating state by the same actuation signal as the speed regulator.

30 Claims, 1 Drawing Sheet

TRACKING AND DRIVING SPEED REGULATING DEVICE FOR MOTOR VEHICLES

FIELD OF THE INVENTION

The present invention relates to a tracking and driving speed regulating device for motor vehicles, having a sensor device for monitoring a road track, a steering regulator for analyzing signals of the sensor device and for issuing steering commands to a steering actuator, and having a cruise controller, acting upon the drive system of the vehicle, which can be switched to an operational state using a main switch, and, in the operational state, may be activated by an actuation signal generated by an operating element

BACKGROUND INFORMATION

Vehicle speed regulating devices for motor vehicles are known, with which the speed of the vehicle is held to a setpoint value set by the driver. By operating the main switch, the cruise control is converted to the operational state. The actual cruise control, however, begins only when the driver gives a so-called set command by using an operating element, typically a multifunctional switch designed as a lever which is positioned near the steering wheel. This command has the effect that the actual speed of the vehicle is assumed as the setpoint value and put in as the basis for the cruise control.

The input of the set command usually takes place by deflecting the multifunctional switch briefly in the direction (set−). Prolonged holding of the multifunctional switch in the (set−) position has the effect of throttling the vehicle engine and gradually decreasing the speed. As setpoint value for the subsequent cruise control, the speed is then taken over which the vehicle had reached when the switch was let go. As a matter of choice, cruise control can also be activated by deflecting the multifunctional switch briefly in the opposite direction (set+). Prolonged holding of the multifunctional switch in the (set+) position has the effect of increasing the setpoint value, and thus accelerating the vehicle. In this case, too, the speed reached by the vehicle, when the switch is let go, forms the setpoint value for the subsequent regulation. By inputting the command "cancel" the cruise controller is inactivated. However, the most recently valid setpoint value remains stored. By inputting the command "resume" the cruise controller can be reactivated, so that cruise control to the previously stored setpoint value can be resumed. Input of the commands "cancel" and "resume" is usually performed by pulling or pushing the multifunctional switch in the direction at right angles to the directions "set−" and "set+". By switching off the main switch, the regulating system is completely inactivated, and the stored setpoint value is deleted.

A further development of this cruise control system, also known as "cruise control", is represented by so-called adaptive cruise control (ACC). In such an ACC system, using a radar device, the distance from a preceding vehicle is additionally measured, and, provided there is a vehicle within the detection range of the radar, the regulation is not made based on the preset setpoint speed but rather based on a safe, speed-dependent setpoint distance from the preceding vehicle. Examples of such ACC systems, the use of which can considerably increase travel comfort and safety, are described in German Published Patent Application No. 42 00 694, as well as in Winner et al.: "*Adaptive Cruise Control System Aspects and Development Trends*", SAE Technical Paper Series 96 1010, 1996, pp 27–36. In these systems it is provided that the regulation of the separation distance is interrupted if the driver intervenes in the driving happenings, for example, by activating the brake.

German Published Patent Application No. 195 07 957 proposes a tracking and travel speed regulating device, which supports the driver not only in keeping to the desired speed and/or the distance from the preceding vehicle, but also in keeping in lane (LKS=lane keeping support). An optical sensor device is provided for this, with the use of which the spatial position of the vehicle with respect to the lane can be detected, for example, by the use of lane markings. If electronic evaluation of the data detected, using the optical sensor device, indicates that the vehicle is approaching a lateral lane limit, an intervention in the steering of the vehicle is made in such a way that the vehicle is drawn into the middle of the lane. As mentioned in the cited document, this automatic tracking function can be activated and deactivated by the driver in a similar manner, as is the case in the vehicle speed regulating device described at the outset. This tracking function is also automatically deactivated when the driver operates the brake or otherwise actively intervenes in the travel happenings. To be sure, a desirable unloading of the driver is achieved by these various types of automated functions, but on the other hand, along with the increasing number of automated functions, there is also an increase in the appertaining operating elements as well as the number of possible combinations of system states, and it is becoming increasingly more difficult for the driver to keep current at all times on the active or inactive state of the systems or partial systems. In some individual cases this may lead to misestimations or to irritations which impair the driver's sense of safety, and thus also of the acceptance of such automatic support systems.

SUMMARY OF THE INVENTION

It is the object of the present invention to create a tracking and driving speed regulating device which makes a simpler and more lucid operation possible for the driver.

According to the present invention, the object is attained by making the steering regulator switchable to an operating state by a separate main switch independent of the speed regulator, and being able to be activated in the operating state by the same actuation signal as the speed regulator.

Although the cruise control (ACC), on the one hand, and the steering control (LKS), on the other hand, fundamentally work independently of each other, according to the present invention, both systems are activated by the same actuation signal, so that a common operating element can be used for producing this actuation signal. In this way, not only is a structural simplification achieved by simplification of the number of operating elements, but, above all, the clarity of the operating system is improved. Yet, the separate main switches make it possible to switch the two systems on and off separately of each other, so that the driver keeps the unlimited freedom of decision on whether, and possibly which of the available functions he wants to use.

However, in the case of regulation, under the conditions under which the automatic tracking function can be used in a way that makes sense (clearly marked lanes, no crossings, off ramps or sharp curves), suitable assumptions for using the cruise control or (inter-automobile) separation regulating function may be in order. This is true particularly in the case of travel on expressways or country roads having few curves. In practice, therefore, the two automatic functions ACC and LKS are mostly used together, and under these circumstances, the possibility of activating both systems by using a single command represents a clear improvement in operating comfort. In a typical application, for example, the case of an express highway trip, after accessing the expressway, the driver has to operate the main switch for both systems only once. Then, during the trip, if, for example, both automatic functions were interrupted because of a braking maneuver, one single command, which produces the actuation signal, ensures that both systems are reactivated again, and for example, a situation is avoided where the driver does indeed reactivate the separation distance regulation, but forgets to reactivate the tracking function as well, and then notes with alarm that the vehicle runs out of the lane.

As a matter of preference, the cruise control and the automatic tracking function can also be deactivated by at least one common switch-off signal. An example of such a common switch-off signal is the signal indicated by the operation of the vehicle brakes. It is also expedient to generate a common switch-off signal when the vehicle speed falls below a certain value, such as 40 km/h, below which neither the automatic speed or separation distance regulation nor the automatic tracking function is meaningful. In vehicles having standard shift, operation of the clutch pedal can also trigger a common switch-off signal.

The "cancel" command, by which the speed or separation distance regulation is deactivated, can also be used for deactivating the tracking function. If the constellation of signals leading to the deactivating of the speed or separation distance regulation system is identical to the constellation of signals leading to the deactivating of the tracking function, then the advantage is that the activating conditions are consistent to the driver, that means, he can rely on the fact that, as long as both main switches are switched on, the tracking function is active when, and only when the cruise control function is also active, and vice versa.

In another embodiment, however, special exceptional conditions can be determined, under which the speed and separation distance regulating function on the one hand, and the tracking function on the other hand, can be deactivated independently of each other, so as to take into account special traffic situations. An example of this would be a situation in which the vehicle is proceeding in the left lane of the expressway and the driver ascertains that, far ahead of him, a truck is veering out to overtake somebody. Even if the truck is not yet within radar range, a far-sighted driver will cut his speed early. This can actually be done by the command "set–", without deactivating the regulating systems, but in that case, the multifunctional switch should be held for a prolonged period. Therefore, many drivers prefer giving the command "cancel" to let the vehicle continue to coast until a suitable, lower setpoint speed has been reached. Under these conditions there is no need for also deactivating the tracking function while the vehicle coasts. Something similar applies when the driver wishes to drop further back from the preceding vehicle, in order to permit a traffic participant driving in front of him, to the right, the possibility of cutting into the left lane. One can take account of these situations by additionally making deactivation of the tracking function dependent on the driver's actively operating the gas pedal and/or intervening in the steering, and thereby letting it be known that he himself wants to assume sole control.

As opposed to this, there are also situations in which the tracking function should be at least briefly deactivated while cruise control remains active. An example would be the case in which the vehicle is approaching a slower preceding vehicle in the right lane. As long as the left lane is free, he will then make a move to pass, without changing speed. The intention of changing lanes can be recognized in this case, for example, by setting the turn signal.

In the ACC system, special-case strategies can be implemented which permit, within certain limits, a temporary approach to the preceding vehicle, for example, when changing to the left lane is not yet possible. Even under these conditions, it is expedient to deactivate the tracking function briefly, in view of the impending lane change.

In every case, the transition between active and inactive phases of the automatic tracking function should be designed to be soft, in order to avoid abrupt interventions in the steering, and so that the driver is not irritated by a sudden change in the anti-torque moment noticeable at the steering wheel.

In the known cruise control and ACC systems, the possibility generally exists of briefly disabling the regulation by operating the gas pedal, so that the vehicle accelerates beyond the set setpoint speed. When the gas pedal is released again, the regulation automatically takes over again as soon as the vehicle's speed has declined to the setpoint value. For reasons of consistency, it is expedient, under these conditions, also temporarily to disable the automatic tracking function together with the cruise control, and then to let it start up again synchronously with the cruise control. The driver will make use of the possibility of "flooring" the gas pedal especially when he wants to prepare for a passing procedure. It then makes sense to deactivate the tracking function. An exception may apply for the special case in which the optical sensor device recognizes that the vehicle is already in the left lane. In that case, the flooring of the gas pedal will then, as a rule, only have the effect of abbreviating the passing procedure in order to make it possible for the passed vehicle to cut into the left lane earlier. Under these conditions, it can be provided that the automatic tracking function remains active, by way of exception.

DETAILED DESCRIPTION

Figure 1:
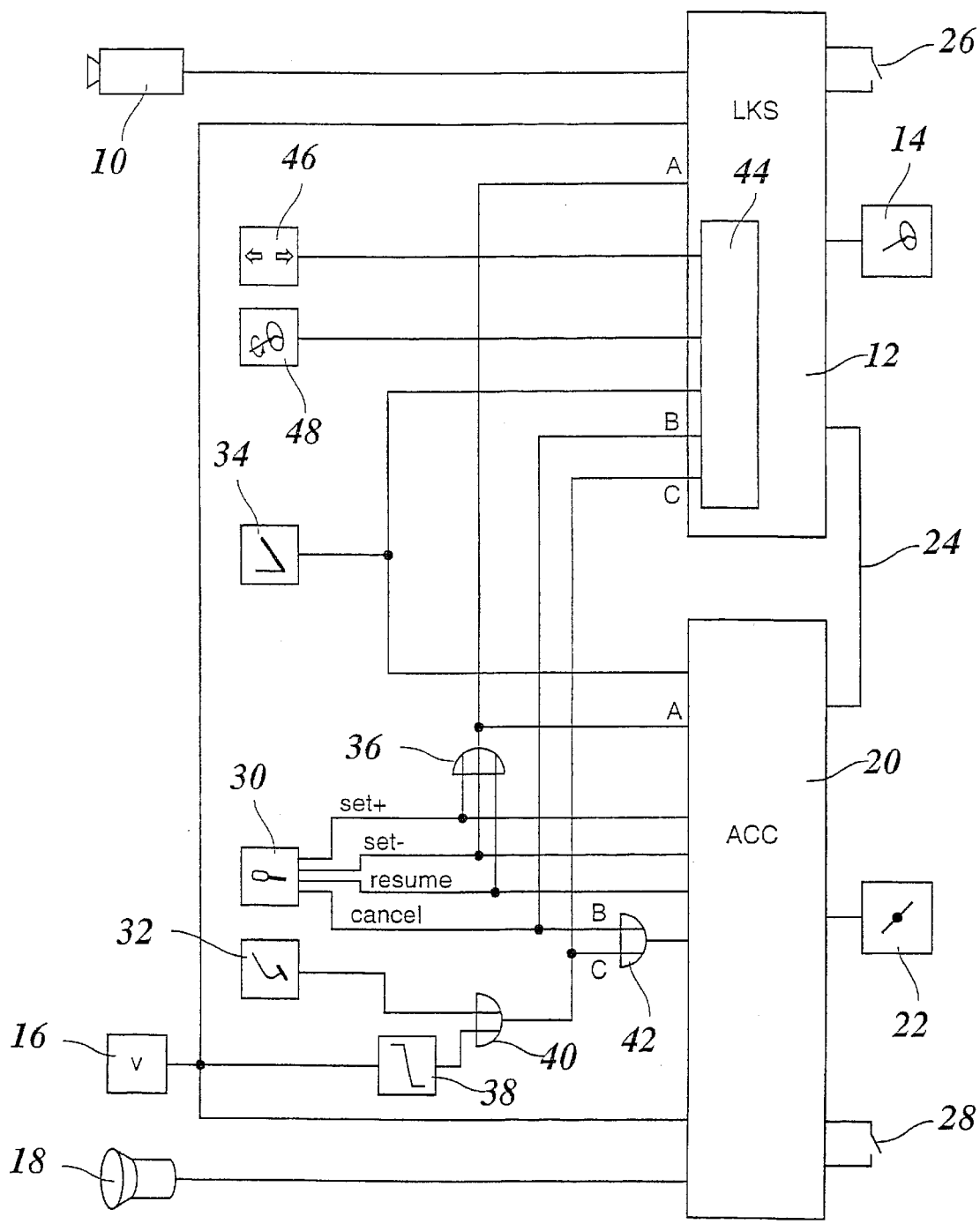
FIG. 1 is a block diagram of the tracking and the driving speed regulating device.

The system illustrated as a block diagram in FIG. 1 includes two control circuits operating largely independently of each other, to be specific, an LKS system (lane keeping support) for automatic tracking of the vehicle, and an ACC system (adaptive cruise control) for regulating driving speed. The ACC system regulates the driving speed to a setpoint value selected by the driver, as long as the lane ahead of the vehicle is clear. When the vehicle follows a slower one, a switchover is made automatically to a separation distance regulation, using a known transition strategy known per se, in which the distance from the preceding vehicle is regulated to s setpoint value. This setpoint value is a function of the actual speed and of a setpoint time gap, which corresponds to the separation in time at which the preceding vehicle and one's own vehicle passes a fixed point in the lane. This setpoint time gap may be selected by the driver within certain limits, e.g. in a range of 1 to 2 seconds.

The LKS system is formed essentially by a sensor device 10, which detects the position of the vehicle relative to the limits of the lane being traveled, a steering regulator 12 and a steering actuator 14 which has an active effect on the steering of the vehicle. Sensor device 10 preferably involves an optical sensor device, here symbolized by an electronic camera, but optionally and in addition, other sensor systems, such as radar sensors in connection with reflectors at the edge of the lane, ultrasound sensors and the like can be used as well. In each case sensor device 10 delivers electronic data which permit the identification of the lane limits, such as white or yellow lane markings, curb-stone edges, green stripes, and the like. These data are digitized and, possibly after suitable processing within sensor device 10, are transmitted to steering regulator 12. There, the distance of the right vehicle limit from the right lane edge, and the distance of the left vehicle limit from the left lane edge, as well as the changes in time of these variables are determined. In the light of these data, it is decided according to a known algorithm whether intervention in the steering process is required. If this is the case, a warning operation in the form of an optical, acoustical and/or haptic (such as a vibrating steering wheel) warning signal is emitted, urging the driver to intervene manually in steering. On the other hand, if a regulating mode is active, an appropriate correction command is issued to steering Actuator 14.

The steering actuator 14 is designed, for example, in such as way that it applies a torque calculated by steering regulator 12, denoted from here on as correction moment, on the steering column of the vehicle. Since the LKS system is intended solely to support the driver, and the responsibility for guiding the vehicle, on the other hand, remains with the driver, it is assumed that the driver constantly has his hands on the steering wheel. If the driver yields to the correction moment fed in, the tracking position of the vehicle is corrected by a corresponding turning of the steering column and the steering wheel. Through the torque fed in, the driver simultaneously receives a feedback saying that the LKS system is active. The size of the correction moment that can be applied with the aid of steering actuator 14 is limited to a preferably speed-dependent value range, which ensures that intervention in the steering process does not lead to instability of the vehicle. On the other hand, the correction moment is large enough that the tracking position of the vehicle can be automatically corrected during straight ahead driving and in response to curves that are not too sharp. If a stronger steering intervention is required for keeping the vehicle within tracking limits, this is indicated to the driver by a warning signal.

The ACC system includes as the most important sensor element a speed sensor 16, which measures the actual speed of the vehicle, and at least one radar sensor 18 attached to the front side of the vehicle, with which obstacles ahead of the vehicle, particularly preceding vehicles, can be located. In addition, the distance from the obstacle and the relative speed between the obstacle and one's own vehicle are measured with the aid of radar sensor 18. The radar sensor can possibly also detect the direction of the obstacle, using a certain angular resolution. An electronic data processing unit, here denoted as speed regulator 20, evaluates the data received from speed sensor 16 and radar sensor 18, and intervenes via at least one actuator 22 in the drive system of the vehicle and possibly also in the braking system, so as to regulate the speed of the vehicle. Depending on the type of the engine, actuator 22 acts upon the throttle valve and/or the fuel injection system.

Steering regulator 12 and speed regulator 20 can directly communicate with each other via a data line 24.

Thus, it is possible, for example, to evaluate a part of the data acquired, with the aid of optical sensor device 10, within speed regulator 20, in order to adapt the position finding depth of the radar to the course of the lane, during curves, or to differentiate between relevant obstacles from irrelevant obstacles in other lanes. Conversely, speed regulator 20 can inform steering regulator 12 about travel situations in which a deliberate change of lanes is to be expected, such as when approaching a preceding vehicle.

Since the level and the point in time of the correction intervention are supposed to be adapted to the current travel speed within the framework of the LKS system, the signal from speed sensor 16 is also evaluated in steering regulator 12. For the refinement of the regulating systems, signals from additional sensors, that are not shown, can be evaluated in steering regulator 12 and/or in speed regulator 20, which represent other relevant motion variables of the vehicle, such as yaw rate or transversal speed.

A main switch 26 or 28, respectively, is assigned to each of steering regulator 12 and speed regulator 20. Using these main switches 26, 28, the functions of the LKS system and the ACC system can be switched on and off independently of each other.

Furthermore, FIG. 1 shows a number of operating elements and sensors which, together with main switches 26, 28, the warning devices mentioned, as well as warning lights not shown and indicators on the dashboard, belong to the user interface of the system. These operating elements and sensors include particularly a multifunctional switch 30 for operating the speed regulating system, a brake pedal sensor 32, which detects the operation of the brake pedal, and a gas pedal sensor 34, which detects the operated or non-operated state as well as position of the gas pedal. These operating elements have the same functions as in a usual ACC system, but, in the arrangement proposed here, they also act upon the LKS system, so that the strategies for activating and deactivating the LKS and ACC regulating functions are integrated and harmonized.

Figure 2:
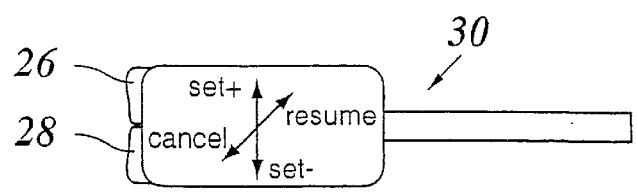
FIG. 2 shows a multifunctional switch.

Multifunctional switch 30, which is illustrated separately in FIG. 2, has the shape of a lever positioned at the steering wheel, which can be swiveled up and down to positions "set+" and "set−", as well as forwards and backwards to positions "cancel" and "resume", from a neutral position, and which automatically returns to the neutral position when it is let go. In the example shown, main switches 26 and 28 are designed as push-buttons, and positioned at the free end of multifunctional switch 30 in such a way that they can be operated both independently of one another and together. In response to pressing a push-button (to the right in FIG. 2), main switches 26, 28 catch in their respective on positions, and upon being pressed again, they return to the off position.

By switching on main switch 26, the LKS system is converted to the operational state. In this state, to be sure, the warning functions are active, but the regulating functions still have to be activated separately.

Correspondingly, by switching on main switch 28, the ACC system is converted to the operational state. However, here too, the regulating function is only activated by a special command, which is entered by using multifunctional switch 30. As long as this command has not been entered, the system emits a collision warning in any case if the radar system ascertains a dangerous approach to an obstacle.

The regulating function of speed regulator 20 is activated by swiveling multifunctional switch 30 briefly into position "set+" or "set−" and then letting go. If multifunctional switch 30 is held in position "set+", speed regulator 20 causes acceleration of the vehicle. The vehicle speed reached by the time the switch is let go is then stored as the setpoint speed for the speed regulation. Correspondingly, the command "set−" has the effect of decelerating the vehicle, and here, too, the speed reached by the time the switch is let go is stored as the setpoint value. Together with the speed regulating function, the separation distance regulating function is activated at the same time, which is, however, only effective if there is an obstacle or a preceding vehicle in the locating range of radar sensor 18.

The ACC regulation is deactivated by pulling multifunctional switch 30 briefly into position "cancel". Switching off the regulation has the result that the vehicle coasts, provided the driver does not step on the accelerator. However, the setpoint value for the speed regulation remains stored until it is replaced by a new setpoint value, or until main switch 28 is switched off. As long as a setpoint value is stored, the command "resume" has the effect that regulation is resumed to this setpoint value. The three commands "set+", "set−" and "resume" thus have the function of activating the ACC control. This is symbolized in FIG. 1 by combining the signals of multifunctional switch 30, corresponding to these three commands, by an OR-gate 36 to one actuation signal A. The same actuation signal A is also supplied to steering regulator 12, and thus has the effect that the ACC and LKS regulating functions are activated simultaneously, as long as both main switches 26 and 28 are switched on. If only main switch 26 is switched on, actuation signal A activates exclusively the LKS regulation.

The signal of multifunctional switch 30 corresponding to the command "cancel" forms a first switch-off signal B for the ACC regulation. This switch-off signal B is also supplied to steering regulator 12, so that the functions of the LKS and the ACC systems are not only activated in common, but are fundamentally also deactivated in common.

The functions of the two control circuits may, however, not be deactivated only by the command "cancel" input by the driver, but also switch themselves off automatically under certain conditions. One of these conditions is satisfied when the driving speed lies below a certain threshold value, such as below 40 km/h. At such low speeds one may assume in general that the travel situation is so unstable that neither ACC regulation nor LKS regulation makes sense. A further condition is the operation of the brake pedal, which is detected with the aid of brake pedal sensor 32. When the driver operates the brake, this generally means that he wishes actively to control the driving situation. Therefore, in this case, too, the regulating functions are deactivated, until they are activated again by the driver by one of the commands "set+", "set−" or "resume".

In the example shown, when the speed falls below the speed threshold value, this is detected by threshold value switch 38, whose output signal is combined by an OR-gate 40 with the signal from brake pedal 32 to form a second switch-off signal C. Switch-off signals B and C are supplied to speed regulator 20 via an OR-gate 42. In steering regulator 12, the switch-off signals B and C are supplied to a special switch-off control 44, which makes possible a more differentiated evaluation of these signals, to the extent that this is wanted. In the embodiment currently viewed as preferred, however, switch-off signals B and C are also evaluated in switch-off control 44 in such a way that the LKS regulation is deactivated as soon as one of switch-off signals B or C is present.

The signal from gas pedal sensor 34 is supplied to both speed regulator 20 and switch-off control 44 in steering regulator 12. However, in speed regulator 20 the signal of gas pedal sensor 34 does not lead to deactivation of the regulating system which can only be reversed by actuation signal A, but only leads to a temporary suspension of the regulating function, as long as the vehicle acceleration requested by the use of the gas pedal is greater than the acceleration called for by actuator 22. This makes it possible for the driver temporarily to exceed the setpoint speed and/or temporarily to enter the separation distance from the preceding vehicle. When the driver releases the gas pedal again, regulation is automatically resumed, and the setpoint value up to the present is used again for speed regulation.

In the preferred exemplary embodiment, the signal of gas pedal sensor 34 has the same effect on steering regulator 12, i.e., the LKS regulating function is suspended exactly when the ACC regulating function is also suspended. This is of advantage to the driver in that he is not confused by different activating and deactivating schemes for the ACC system and the LKS system. Thus, the driver can rely on the fact that, as long as both main switches 26 and 28 are switched on, either both systems are active or both systems are inactive.

In the example shown, switch-off control 44 additionally accepts a signal from a turn signal switch 46 and a signal from a torque sensor 48, which specifies the torque applied by the driver upon the steering wheel. The effects of these signals are analogous, with respect to the LKS system, to the effect of the signal of gas pedal sensor 34. The LKS regulating function is not deactivated, but only suspended temporarily.

When the driver operates the turn signal, this means that he wishes to change lanes. The LKS regulating function is therefore suspended, so that steering actuator 14 does not work against the torque applied by the driver's hand upon the steering wheel, during changing of lanes. Various strategies are conceivable, in this case, for the resumption of LKS regulation. For example, regulation can automatically be resumed if sensor device 10 determines that changing lanes has actually taken place. Alternatively, or in addition, it is possible to resume the regulating function after the expiration of a certain delay period after switching off turn signal switch 46. Resumption of the regulating function can also possibly be tied to the fact that the torque detected by torque sensor 48, which the driver applies to the steering wheel, remains below a certain threshold value during a certain time interval.

On the other hand, the signal of torque sensor 48 effects a temporary suspension of the LKS regulating function when the torque applied by the driver exceeds a certain threshold value, i.e., when the driver makes it known by active steering operation that he wishes temporarily to assume control himself. The regulation is then automatically resumed again when the torque lies once again below the threshold value for a certain time interval, or when it is determined by the use of sensor device 10 that the current lane was kept to during a certain time interval.

Because the signals of turn signal switch 46 and torque sensor 48 act here only upon steering regulator 12, it is true that, in a certain sense, the rule is broken that the LKS regulation and the ACC regulation are always simultaneously active and inactive, but this corresponds in these exceptional cases to the supposed intention of the driver, and since the regulation is resumed automatically, the breaking of the rule may hardly be noticeable to the driver. Analogously, other conditions are also conceivable, whereby the LKS regulation may be suspended temporarily, such as in dependence on special driving situations detected with the aid of radar sensor 18, and which let a lane change or another steering intervention by the driver appear probable.

LKS regulation is also suspended if, and as long as evaluation of the signal of sensor device 10 shows that the lane limits cannot be identified with sufficient certainty. The driver may be advised of this circumstance by a warning signal.

In a modified embodiment, exception strategies may be provided in which the LKS regulation remains active under certain circumstances even when ACC regulation is temporarily deactivated. If the driver enters the command "cancel" because he wishes to assume control himself, he will normally operate the gas pedal himself after a relatively short time. On the other hand, if he leaves the gas pedal unoperated, this indicates that he wishes to use the command "cancel" only for letting the vehicle coast for a longer period of time, in order to clearly reduce speed, and that he will then resume regulation using the command "set" or "resume". One can take account of this constellation by the fact that switch-off signal B leads to deactivating of the LKS regulation only when a signal from gas pedal sensor 34 also arrives after the appearance of switch-off signal B.

Furthermore, switch-off control 44 can also be designed in such a way that, when the driver operates the gas pedal without having previously entered the command "cancel", the LKS regulation, in contrast to the ACC regulation, is only suspended when a traffic situation detected by sensor device 10 and radar sensor 18 lets it be recognized that a lane change or another active steering intervention by the driver is imminent.

In general, the transitions in response to activating and deactivating, as well as suspending the function of the LKS regulation should be designed soft, in the sense that the torque generated by steering actuator 14 builds up only gradually, and also diminishes only gradually.

In particular, in cases where the driver himself intervenes in the steering process, so that the torque applied by him is added to the correction moment applied by steering actuator 14, during inactivation or suspension of regulation, the correction moment should be diminished so carefully that the driver is not irritated. This may be achieved by a relatively small, steady diminishing of the correction moment. Optionally, even in cases in which torque sensor 48 indicates an active intervention by the driver, the correction moment generated in this instant by steering actuator 14 may be "frozen" until the torque applied by the driver abates again. Diminishing of the correction moment in the case of inactivating, or the build-up of another correction moment in the case of resumption of regulating then takes place during the phase in which the driver allows the steering wheel to return to the neutral position by using the resetting forces exercised by the vehicle's wheels.

What is claimed is:

1. A tracking and driving speed regulating device for a motor vehicle, comprising:
   a sensor device for detecting lane tracking;
   a first main switch;
   a second main switch;
   a speed regulator for acting upon a driving system of the motor vehicle, the speed regulator being switchable to an operating state by the first main switch and being capable of being activated in the operating state by an actuation signal generated by an operating element; and
   a steering regulator for evaluating a signal from the sensor device and for issuing a steering command to a steering actuator, the steering regulator being switchable to the operating state by the second main switch independent of the speed regulator and being capable of being activated in the operating state by the actuation signal generated by the operating element.

2. The regulating device according to claim 1, wherein: the steering regulator and the speed regulator are capable of being deactivated by a least one common switch-off signal.

3. The regulating device according to claim 2, wherein: the at least one switch-off signal includes a first switch-off signal generated by a driver command and a second switch-off signal generated automatically in accordance with an operating condition of the vehicle.

4. The regulating device according to claim 3, wherein: the speed regulator and the steering regulator are always deactivated when at least one of the at least one switch-off signal is present.

5. The regulating device according to claim 3, wherein: the steering regulator is deactivated when one of:
   the second switch-off signal is present, dependent on an operating condition, and
   a signal from a gas pedal sensor appears after the first switch-off signal appears, the signal from the gas pedal sensor indicating an operation of the gas pedal.

6. The regulating device according to claim 5, wherein: the signal from the gas pedal sensor temporarily suspends a regulating function in the speed regulator and the steering regulator for a duration of the operation of the gas pedal.

7. The regulating device according to claim 1, wherein: a signal provided by a turn signal switch temporarily suspends a regulating function of the steering regulator.

8. The regulating device according to claim 1, wherein: the speed regulator receives a signal from a radar sensor for detecting a distance from a preceding vehicle, the speed regulator being operable for an adaptive cruise control system having separation distance regulation.

9. The regulating device according to claim 8, wherein: the speed regulator and the steering regulator communicate with each other, the steering regulator being capable of temporarily suspending a regulating function in accordance with a reaction of the speed regulator to a predetermined traffic situation detected by the radar sensor.

10. The regulating device according to claim 1, wherein the operating element includes a multifunctional switch arrangement coupled to the speed regulator and the steering regulator.

11. The regulating device according to claim 10, wherein the multifunctional switch arrangement includes a cruise control switch arrangement.

12. The regulating device according to claim 11, wherein the cruise control switch arrangement includes a set function, a resume function and a cancel function.

13. The regulating device according to claim 12, wherein the set function includes an increasing set function and a decreasing set function.

14. The regulating device according to claim 12, wherein the actuation signal is provided when one of the set function and the resume function is active.

15. The regulating device according to claim 10, wherein the multifunctional switch arrangement includes a logic arrangement to provide the actuation signal.

16. The regulating device according to claim 15, wherein the logic arrangement includes an OR function.

17. The regulating device according to claim 10, wherein the actuation signal is provided when one of a set function and a resume function of the multifunctional switch arrangement is active.

18. A regulating system for a motor vehicle, comprising:

a switch arrangement to provide an actuation signal;

a speed regulator arrangement to provide a cruise control function in the motor vehicle, the speed regulator being switchable to its operating state by a first main switch and being activatable in its operating state by the actuation signal from the switch arrangement; and a steering regulator arrangement to evaluate a signal from a lane sensing arrangement, and to provide a steering command to a steering actuator, the steering regulator being switchable, independent of the speed regulator, to its operating state by a second main switch, and being activatable in its operating state by the actuation signal from the switch arrangement.

19. The regulating system according to claim 18, wherein the switch arrangement includes a multifunctional switch arrangement, which is coupled to the speed regulator and the steering regulator.

20. The regulating system according to claim 19, wherein the multifunctional switch arrangement includes a cruise switch arrangement.

21. The regulating system according to claim 20, wherein the cruise control switch arrangement includes a set function, a resume function and a cancel function.

22. The regulating system according to claim 21, wherein the set function includes an increasing set function and a decreasing set function.

23. The regulating system according to claim 21, wherein the actuation signal is provided when one of the set function and the resume function is active.

24. The regulating system according to claim 18, wherein the switch arrangement includes a logic arrangement to provide the actuation signal.

25. The regulating system according to claim 24, wherein the logic arrangement includes an OR function.

26. The regulating system according to claim 18, wherein the actuation signal is provided when one of a set function and a resume function of the switch arrangement is active.

27. A regulating system for a motor vehicle, comprising:

means for providing switching functions and for providing an actuation signal;

means for providing a speed control function in the motor vehicle, and being switchable to its operating state by a first main switch and being activatable in its operating state by the actuation signal from the means for providing switching functions; and means for providing a steering regulator function and for evaluating a signal from a lane sensing arrangement, and for providing a steering command to a means for steering, and being switchable to its operating state by a second main switch, and being activatable in its operating state by the actuation signal from the means for providing switching functions.

28. The regulating system according to claim 27, wherein:

the means for providing switching functions includes a cruise control switch arrangement, and further includes a logic arrangement to provide the actuation signal, the cruise control switch arrangement includes a set function, a resume function and a cancel function, and the actuation signal is provided when one of the set function and the resume function is active.

29. The regulating system according to claim 28, wherein the set function includes an increasing set function and a decreasing set function.

30. The regulating system according to claim 28, wherein the logic arrangement includes an OR function.

* * * * *